United States Patent [19]
Pennington

[11] Patent Number: 5,425,598
[45] Date of Patent: Jun. 20, 1995

[54] SYSTEM FOR SPARGING GROUND WATER CONTAMINANTS

[76] Inventor: Leslie H. Pennington, 852 E. Windsor La., Bountiful, Utah 84010

[21] Appl. No.: 105,756

[22] Filed: Aug. 12, 1993

[51] Int. Cl.$^6$ .............................................. B09B 1/00
[52] U.S. Cl. ............................ 405/118; 210/751; 405/52; 588/249
[58] Field of Search ............... 405/128, 129, 258, 52, 405/53; 210/747, 751, 170; 588/249

[56] References Cited

U.S. PATENT DOCUMENTS

| | | | |
|---|---|---|---|
| 5,095,975 | 3/1992 | Bernhardt | 166/370 X |
| 5,116,163 | 5/1992 | Bernhardt | 405/128 |
| 5,190,108 | 3/1993 | Mansuy | 166/370 X |
| 5,286,141 | 2/1994 | Vigneri | 405/128 |
| 5,318,116 | 6/1994 | Vinegar et al. | 405/128 X |
| 5,332,333 | 7/1994 | Bentley | 405/128 |

*Primary Examiner*—Dennis L. Taylor
*Attorney, Agent, or Firm*—Thorpe North & Western

[57] ABSTRACT

Apparatus and method for sparging ground water by developing density driven convection and promoting the physical removal and biodegradation of contaminants. The method includes providing a well casing having two fluid permeable sidewalls separated by a fluid impermeable sidewall, and inserting the well casing into a generally vertical borehole so that the fluid permeable sidewalls are positioned below the water table. An injector tube is provided in the well casing so that a lower end thereof is located at the lower end of the well casing and below the level of ground water collected in the well casing. Gas under pressure is forced out the lower end of the injector tube and into the ground water collected in the well casing to cause the gas to carry water upwardly within the well casing and out the well casing through the uppermost fluid permeable sidewall. This causes water to be drawn into the lowermost fluid permeable sidewall, producing a vertically oriented circulation of ground water into the lower end of the well casing and out the uppermost permeable sidewall.

8 Claims, 1 Drawing Sheet

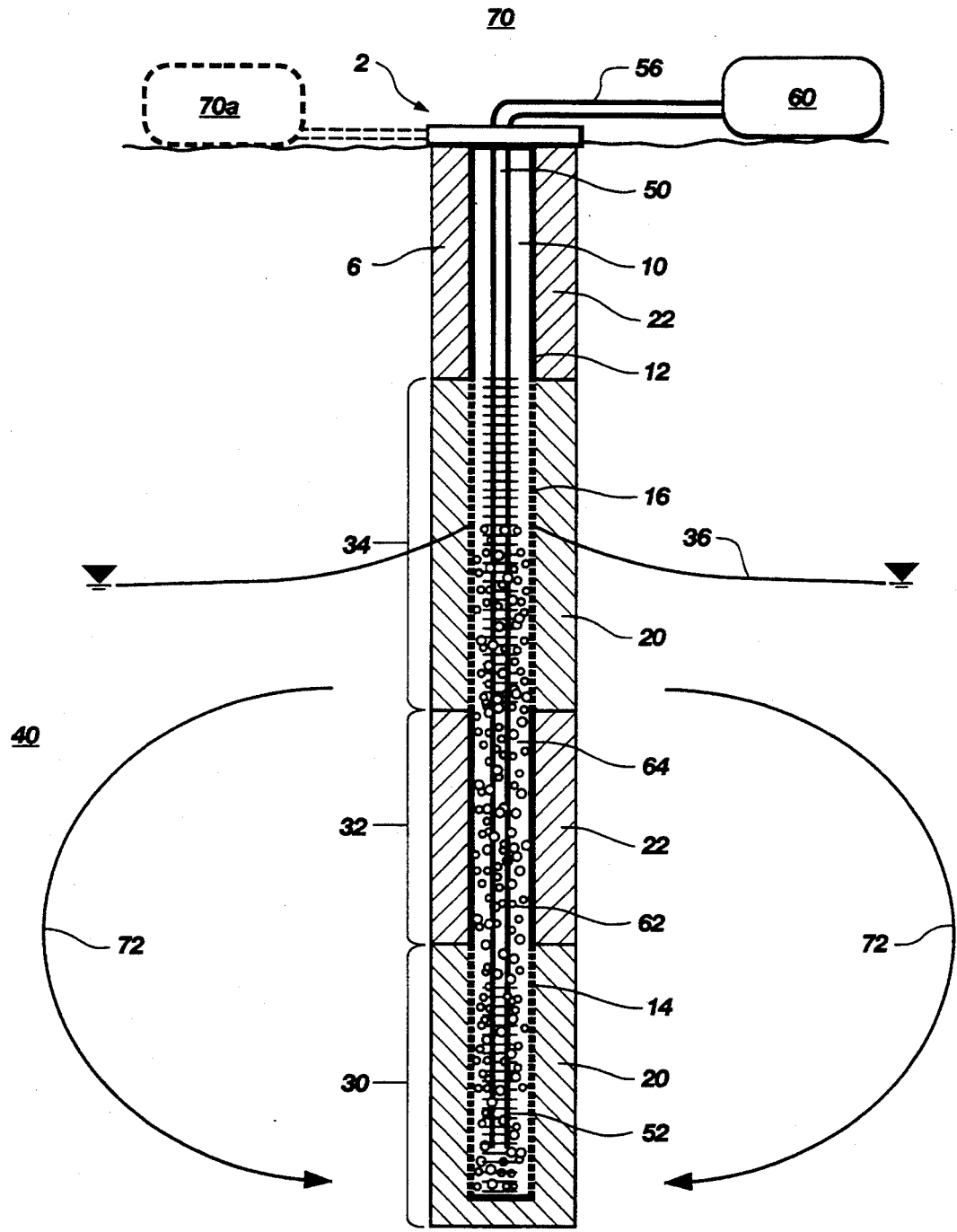

SYSTEM FOR SPARGING GROUND WATER CONTAMINANTS

BACKGROUND OF THE INVENTION

This invention relates to a process and apparatus for sparging ground water to accomplish both the physical removal and natural biodegradation of ground water contaminants.

Due to the accidental and/or intentional release of industrial byproducts, contaminants often exist in the ground surrounding many industrial and commercial facilities, as well as waste disposal sites. Many of these contaminants filter through the soil and leak into the ground water, with the result of dangerous chemicals being dissolved and/or suspended in the water. These contaminants often render the ground water unfit, not only for consumption, but also for other uses such as agriculture. Due to the need for clean water and the environmental risks of allowing the contaminated ground water to remain, it is usually desirable to rid the ground water of the contaminants.

A variety of techniques have been used for removal of the contaminants both from the soil and from the ground water. For example, U.S. Pat. No. 4,323,122, proposes the application of a vacuum to a borehole at the level of the water table, the premise being that contaminants, such as gasoline, which have a lesser density than water would stay on the surface of the ground water and could easily be removed. Because it only clears the contaminants that remain on the surface of the ground water, this procedure fails to rid the water of contaminants which are either dissolved in or suspended in the water.

Other proposals have suggested venting the soil to cause vaporization of the contaminants in the soil, and then applying a vacuum to remove the vaporized contaminants. These techniques, however, failed to treat the ground water beneath the soil. Often, the ground water beneath the soil is removed in a separate phase and treated separately. Such separate treatment increases both the time and expense necessary to treat the ground water since the water would have to be removed from the ground, treated, and then returned to the ground.

Recently, several patents have been granted on methods for treating the ground water as the soil is treated. U.S. Pat. No. 5,082,053 reveals an arrangement for cleaning contaminated ground water, which includes a pump and multiple filters placed within a pipe and located beneath the ground water level. As the water circulates through the pump, the filters clean at least some of the suspended contaminants out of the ground water. The disadvantages of this device are that 1) it requires a well shaft of sufficient diameter to house the pump and filters, and 2) the filters would presumably need to be replaced with greater frequency, the greater the concentration of the contaminants.

Another technique is shown in U.S. Pat. No. 5,076,360 and U.S. Pat. No. 5,050,676. These patents reveal methods and apparatus for vacuum extraction of contaminants from the ground involving withdrawal of liquid and gaseous phases as a common stream, separation of the liquid and gases, and separate treatment of each to produce a clean effluent. Each of these patents teaches the advantages of creating a vacuum within the well to pull up water which can then be used to flush the nearby soil. In the '360 patent, a pipe is added which releases compressed air to raise the water level and to strip the water of volatile contaminants.

The major disadvantages with these techniques is the complexity and expense which they require to clean the ground water. Both the '360 and '676 patent require a vacuum pressure to be maintained within the well. This seemingly requires the well to have an airtight casing, which may or may not be practical. Additionally, the well must be capped in such a way as to allow for a vacuum to be attached. Further, the negative pressure created within the well limits the amount of oxygen or other gasses that can flow into the ground water and promote microbial biodegradation of the contaminants by fungi and bacteria.

SUMMARY OF THE INVENTION

It is an object of the invention to provide a system for ground water sparging which is efficient and economical in removing contaminants from ground water.

It is a further object of the invention to provide a system for ground water sparging which obviates the need to maintain vacuum pressure in the well in which the sparging is performed.

It is an additional object of the invention to provide a system for ground water sparging which both physically removes and naturally biodegrades ground water contaminants.

The above and other objects of the invention are realized in a specific illustrative embodiment of a system for sparging ground water in a borehole which extends from the ground surface downwardly below a water table surface. The system includes a well casing disposed in the borehole, with the well casing including a liquid permeable lower sidewall disposed at a first location below the water table surface, a liquid impermeable central sidewall disposed at a second location above the first location, but below the water table surface, and a liquid permeable upper sidewall disposed at a third location above the second location and at least a portion of which is located below the water table surface. Also included is an injection tube disposed to extend downwardly in the well casing to a lower end termination located adjacent the lower sidewall of the casing, for injecting gas under pressure out of a lower end of the tube to thereby produce upward gas flow in the water in the casing which draws in more water through the lower sidewall, carries it upwardly and out the upper sidewall.

In accordance with one aspect of the invention, the well casing includes a tube with sidewalls having openings therein to allow liquid to flow therethrough, permeable packing material disposed about the exterior of the tube at the first location and third location, and impermeable packing material disposed about the exterior of the tube at the second location and above the third location.

BRIEF DESCRIPTION OF THE DRAWINGS

The above and other objects, features and advantages of the invention will become apparent from a consideration of the following detailed description presented in connection with the accompanying drawing which shows a side, cross-sectional view of a system for sparging ground water.

DETAILED DESCRIPTION

Referring now to the drawing, there is shown a system 2 for sparging ground water. The system 2 utilizes a generally vertically disposed borehole 6, and includes a well 10 positioned colinearly with the borehole. The well 10 includes a well casing 12 which can be made in a tubular shape of virtually any rigid material, but most commonly PVC pipe, steel or stainless steel. The well casing 12 comprises a first section 14 and a second section 16, both of which have perforations or similar openings to allow fluid flow into or out of the well casing.

The well 10 further includes permeable packing material 20, and impermeable packing material 22. The permeable packing material 20 includes, for example, sand pack or some other fluid permeable composition. The impermeable packing material 22 might illustratively include grout, a bentonite seal, or some other impermeable packing material.

The well casing 12 and packing material 20 and 22 define sidewalls 30 and 34 which are water permeable, and sidewall 32 which is water impermeable. Sidewalls 30 and 32 are located below water table 36, and at least a portion of sidewall 34 is below the water table, and so exposed to a ground water 40.

A gas injection tube 50 is placed into the well casing 12 so that a distal end 52 thereof is located adjacent to the lower sidewall 30. Attached to an opposite end 56 of the injection tube is an air compressor 60 or some other means for forcing air or other gases, such as anhydrous ammonia, down the injection tube. As the gas 62 leaves the distal end 52 of the injection tube 50, it travels upwardly through water 64 which has collected in the well casing 12 due to hydrostatic pressure. As the gas rises within the well casing 12, it creates an upward flow of the water 64 within the well casing past the central sidewall 32. Due to the permeable packing material 20 and the perforated section 16 which comprise the upper water permeable sidewall 34, the upward flow of water is able to escape from the well casing 12 through the sidewall 34 and return to the ground water 40.

Water entering the lower sidewall 30, being raised past the central sidewall 32 and escaping through the upper sidewall 34, forms a circulating flow pattern indicated by arrows 72. Because the gas travels upwardly faster than the water, volatile contaminants dissolved in the water are transferred to the gas phase and are carried out of the well casing 12 and into the atmosphere 70 or into a treatment system 70a, for removal of volatile contaminants prior to release to the atmosphere.

In addition to carrying away some contaminants, application of the gas under a positive pressure to water in the well casing 12 (rather than a negative pressure as is used in some other systems) allows the gas to be partially dissolved in the water 64 and to be carried by the water into the ground water 40. As the water 64 escapes out of the upper sidewall 34 and back into surrounding soil and/or ground water 40, it carries the dissolved gas, usually oxygen or some nutrient gas such as anhydrous ammonia. These gases can then provide electron acceptor (for example, oxygen), inorganic nutrients (for example, anhydrous ammonia), and/or a food source (for example, methane) for microbes such as bacteria and fungi which naturally biodegrade the contaminants.

Thus, the instant invention provides a simple and efficient system for naturally eliminating contaminants from ground water. Additionally, the system does not require special valves or vacuums to be attached to the top of the well casing and does not require water or vapor removal from the well casing.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A system for sparging ground water utilizing a borehole which extends from the ground surface downwardly below a water table surface, comprising
    well means disposed in the borehole, and including a liquid permeable lower sidewall disposed at a first location below the water table surface, a liquid impermeable central sidewall disposed at a second location above the first location, but below the water table surface, and a liquid permeable upper sidewall disposed at a third location above the second location and at least a portion of which is located below the water table surface, and
    an injection tube disposed to extend downwardly in the well means to a lower end termination located adjacent the lower sidewall of the well means, for injecting gas under pressure out a lower end of the tube to thereby produce frothing in water in the well means which draws in more water through the lower sidewall, carries it upwardly and out the upper sidewall.

2. A system as in claim 1 wherein the well means comprises a well casing with sidewalls having openings therein to allow liquid to flow therethrough,
    permeable packing material disposed about the exterior of the well casing at the first location and third location, and
    impermeable packing material disposed about the exterior of the well casing at the second location and above the third location.

3. A system as in claim 1 wherein said gas is selected from the group consisting of ambient air, oxygen, anhydrous ammonia, methane and mixtures thereof.

4. A method for sparging ground water and promoting biodegradation of contaminants by microbes, said method comprising the steps of:
    (a) providing a well casing means having two fluid permeable sidewalls separated by a fluid impermeable sidewall,
    (b) locating the well casing means in a generally vertical borehole and positioning the well casing means in a direction collinear with the borehole, such that the fluid permeable sidewalls are positioned below a water table surface, and such that ground water collects in a bottom end thereof,
    (c) providing an injector tube in the well casing so that a lower end of the injector tube is located below the level of the ground water collected in the bottom end of the well casing, (d) forcing a gas under pressure out the lower end of the injector tube and into the ground water, wherein a portion of the gas is absorbed and retained by the ground water.

5. The method of claim 4 wherein the gas of step (d) is air.

6. The method of claim 4 wherein the gas of step (d) is primarily oxygen.

7. The method of claim 4 wherein the gas of step (d) is anhydrous ammonia.

8. The method of claim 4 wherein the gas of step (d) is methane.

* * * * *

REEXAMINATION CERTIFICATE (3273rd)

United States Patent [19]
Pennington

[11] B1 5,425,598
[45] Certificate Issued Jul. 15, 1997

[54] SYSTEM FOR SPARGING GROUND WATER CONTAMINANTS

[76] Inventor: Leslie H. Pennington, 852 E. Windsor La., Bountiful, Utah 84010

Reexamination Request:
No. 90/004,290, Jun. 28, 1996

Reexamination Certificate for:
Patent No.: 5,425,598
Issued: Jun. 20, 1995
Appl. No.: 105,756
Filed: Aug. 12, 1993

[51] Int. Cl.⁶ .................................................. B09B 1/00
[52] U.S. Cl. ................... 405/128; 210/751; 405/52; 588/249
[58] Field of Search ................... 210/170, 258, 210/747, 751, 150; 166/266, 267

[56] References Cited

U.S. PATENT DOCUMENTS

| | | | |
|---|---|---|---|
| 4,886,119 | 12/1989 | Bernhardt et al. | |
| 4,892,688 | 1/1990 | Bernhardt | |
| 4,943,305 | 7/1990 | Bernhardt | |
| 4,950,394 | 8/1990 | Bernhardt | |
| 5,076,360 | 12/1991 | Morrow | |
| 5,095,975 | 3/1992 | Bernhardt | 166/370 X |
| 5,116,163 | 5/1992 | Bernhardt | 405/128 |
| 5,143,607 | 9/1992 | Bernhardt | |
| 5,147,535 | 9/1992 | Bernhardt | |
| 5,180,503 | 1/1993 | Gorelick et al. | |
| 5,190,108 | 3/1993 | Mansuy | 166/370 X |
| 5,286,141 | 2/1994 | Vigneri | 405/128 |
| 5,318,116 | 6/1994 | Vinegar et al. | 405/128 X |
| 5,318,698 | 6/1994 | Bernhardt | |
| 5,332,333 | 7/1994 | Bentley | 405/128 |
| 5,389,267 | 2/1995 | Gorelick et al. | |
| 5,402,848 | 4/1995 | Kelly | |

OTHER PUBLICATIONS

U.S. Department of Commerce, Control of Volatile Organic Contaminants in Groundwater by In–Well Aeration, 3/88.
Groundwater & Wells, Second Edition, 1986.
A New Method for In–Situ Remediation of Volatile Contaminants in Groundwater.... Institute of Hydromechanics, 1990.
U.S. Environmental Progtection Agency, Project Summary, Control of Volatile Organic Contaminants in Ground water by In–Well Aeration, Apr. 1988.

*Primary Examiner*—Dennis L. Taylor

[57] ABSTRACT

Apparatus and method for sparging ground water by developing density driven convection and promoting the physical removal and biodegradation of contaminants. The method includes providing a well casing having two fluid permeable sidewalls separated by a fluid impermeable sidewall, and inserting the well casing into a generally vertical borehole so that the fluid permeable sidewalls are positioned below the water table. An injector tube is provided in the well casing so that a lower end thereof is located at the lower end of the well casing and below the level of ground water collected in the well casing. Gas under pressure is forced out the lower end of the injector tube and into the ground water collected in the well casing to cause the gas to carry water upwardly within the well casing and out the well casing through the uppermost fluid permeable sidewall. This causes water to be drawn into the lowermost fluid permeable sidewall, producing a vertically oriented circulation of ground water into the lower end of the well casing and out the uppermost permeable sidewall.

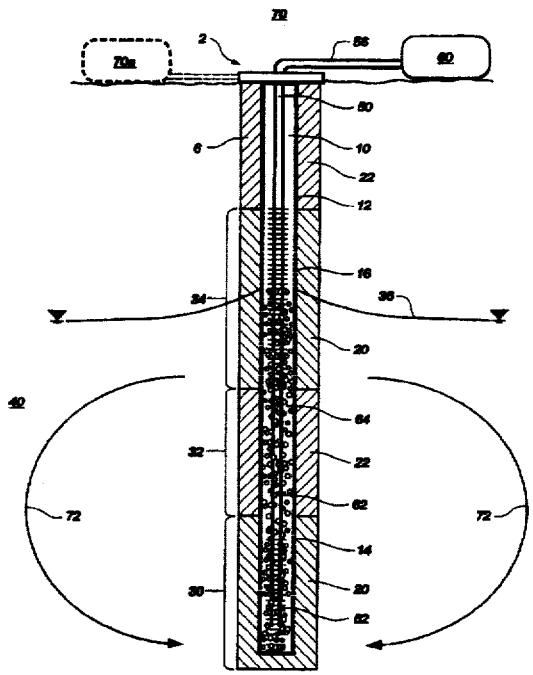

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 is confirmed.

New claims 9–22 are added and determined to be patentable.

9. *A system for sparging ground water utilizing a borehole which extends from the ground surface downwardly below a water table surface, comprising:*

*well means disposed in the borehole, and including a liquid permeable lower sidewall disposed at a first location below the water table surface, a liquid impermeable central sidewall disposed at a second location above the first location, but below the water table surface, and a liquid permeable upper sidewall disposed at a third location above the second location and at least a portion of which is located below the water table surface, and*

*an injection tube disposed to extend downwardly in the well means to a lower end termination located adjacent the lower sidewall of the well means, for injecting gas under pressure out a lower end of the tube to create a positive pressure within the casing to thereby produce frothing in water in the well means which draws in more water through the lower sidewall and directs it upwardly and out the upper sidewall, thereby forming a circulation flow pattern in ground water outside the well means.*

10. *The system of claim 9, wherein a gas injected by said injection tube and the permeable upper and lower sidewalls form an exclusive means for removing water and vapor from the well means.*

11. *The system of claim 9, wherein the only structure disposed within said well means is said injection tube.*

12. *The system of claim 9, wherein gas raising through said well means passes directly to atmosphere.*

13. *The system of claim 9, wherein the well means is configured to facilitate gas dissolving in the water and being carried out of said well means through said upper permeable sidewall.*

14. *The system of claim 9, wherein the well means is characterized by the lack of structure for separating water and gas within the well means.*

15. *The system of claim 9, wherein the system is configured to maintain a positive pressure throughout the well means above the lower end termination of the injection tube.*

16. *A method for sparging ground water and promoting biodegradation of contaminants by microbes, said method comprising the steps of:*

(a) *providing a well casing means having two fluid permeable sidewalls separated by a fluid impermeable sidewall, so as to form upper and lower fluid permeable sidewalls,*

(b) *locating the well casing means in a generally vertical borehole and positioning the well casing means in a direction collinear with the borehole, such that the fluid permeable sidewalls are positioned below a water table surface, and such that ground water collects in a bottom end thereof,*

(c) *providing an injector tube in the well casing so that a lower end of the injector tube is located below the level of the ground water collected in the bottom end of the well casing,*

(d) *forcing a gas under pressure out the lower end of the injector tube and into the ground water collected in the bottom of the well so that said gas lifts the ground water in the bottom end, and*

(e) *wherein the well is configured to promote a portion of the gas being absorbed and retained by the ground water as it flows out of the upper fluid permeable sidewall and below the water table surface.*

17. *The method according to claim 16, wherein the method comprises, more specifically configuring said well to promote the transfer of gas dissolved in water from within the well casing means to ground water surrounding the well casing means.*

18. *The method according to claim 16, wherein the method further comprises maintaining a positive pressure throughout the well casing means above the lower end termination of the injection tube.*

19. *The system of claim 1, wherein the well means is characterized by the lack of a structure for separating the ground water and gas in the well means.*

20. *The method according to claim 4, wherein the method comprises, more specifically, supplying gas with sufficient force to produce frothing in water within the well casing means and to lift water within the well casing means.*

21. *A system for sparging ground water utilizing a borehole which extends from the ground surface downwardly below a water table surface, comprising:*

*well means disposed in the borehole, the well means including a well casing having (i) a liquid permeable lower sidewall disposed at a first location below the water table surface, (ii) a liquid impermeable central sidewall disposed at a second location above the first location, but below the water table surface, and (iii) a liquid permeable upper sidewall disposed at a third location above the second location and at least a portion of which is located below the water table surface, and packing material disposed adjacent to the well casing, the packing material being permeable adjacent to the lower sidewall and upper sidewall and impermeable adjacent the central sidewall;*

*an injection tube disposed to extend downwardly in the well means to a lower end termination located adjacent the lower sidewall of the well means, for injecting gas under pressure out a lower end of the tube to thereby produce frothing in water in the well means which draws in more water through the lower sidewall, carries it upwardly and out the upper sidewall; and*

*wherein injection of gas through the injection tube creates a circulating flow pattern in the well means and in the ground water outside the well means to thereby circulate gas into the groundwater, and causes gas to pass through water in the well to strip contaminants therefrom and carry the contaminants out of the well means.*

22. *The system of claim 21, further comprising a vapor treatment system disposed at the top of the well means for collecting gas rising out of the well and for removal of the contaminants from the gas prior to release of the gas to the atmosphere.*

* * * * *